(12) United States Patent
Penaflor et al.

(10) Patent No.: US 10,564,519 B2
(45) Date of Patent: Feb. 18, 2020

(54) OPTICAL LIGHTING ACCESSORY FOR MOBILE PHONE DEVICES WITH CAMERA AND FLASH

(71) Applicants: Ronaldo Green Penaflor, Fallbrook, CA (US); Ronaldo Narvaza Penaflor, Fallbrook, CA (US)

(72) Inventors: Ronaldo Green Penaflor, Fallbrook, CA (US); Ronaldo Narvaza Penaflor, Fallbrook, CA (US)

(73) Assignee: iP TECH PROS Inc., San Diego, CA (US)

(*) Notice: Subject to any disclaimer, the term of this patent is extended or adjusted under 35 U.S.C. 154(b) by 219 days.

(21) Appl. No.: 15/919,211

(22) Filed: Mar. 13, 2018

(65) Prior Publication Data
US 2019/0243214 A1 Aug. 8, 2019

Related U.S. Application Data

(63) Continuation-in-part of application No. 15/886,845, filed on Feb. 2, 2018, now Pat. No. 10,012,888.

(51) Int. Cl.
*G03B 15/05* (2006.01)
*H04M 1/02* (2006.01)
*H04N 5/225* (2006.01)
*H04M 1/21* (2006.01)

(52) U.S. Cl.
CPC .......... *G03B 15/05* (2013.01); *H04M 1/0264* (2013.01); *H04N 5/2256* (2013.01); *H04N 5/2257* (2013.01); *G03B 2215/0535* (2013.01); *G03B 2215/0567* (2013.01); *G03B 2215/0589* (2013.01); *H04M 1/21* (2013.01)

(58) Field of Classification Search
CPC ............ G03B 15/05; G03B 2215/0567; G03B 2215/0535; G03B 2215/0589; H04N 5/2257; H04N 5/2256; H04M 1/0264; H04M 1/21
See application file for complete search history.

(56) References Cited

U.S. PATENT DOCUMENTS

| | | | |
|---|---|---|---|
| 9,316,539 B1 * | 4/2016 | Phua | G01J 3/0256 |
| 2012/0052929 A1 * | 3/2012 | Thammasouk | G06F 1/1626 |
| | | | 455/575.1 |
| 2018/0054565 A1 * | 2/2018 | Smith | G03B 17/565 |

* cited by examiner

*Primary Examiner* — David V Bruce

(57) ABSTRACT

An optical lighting accessory is described for use with a handheld mobile device in photography or videography applications. The handheld mobile device includes at least a rear-facing camera and light source. The optical lighting accessory includes an accessory case having optical light ports and an attachment member for securing the device to the accessory case, an optical element coupled to at least one of the optical light ports, the optical element configured to receive, capture and communicate a plurality of light rays emitted by the light source, and a light diffuser layer coupled to the optical element and configured to receive the light rays communicated by the optical element, the light diffuser layer transforms the light rays into a diffused light source, the diffuser layer is configured to communicate the diffused light source to the rear-facing camera.

20 Claims, 19 Drawing Sheets

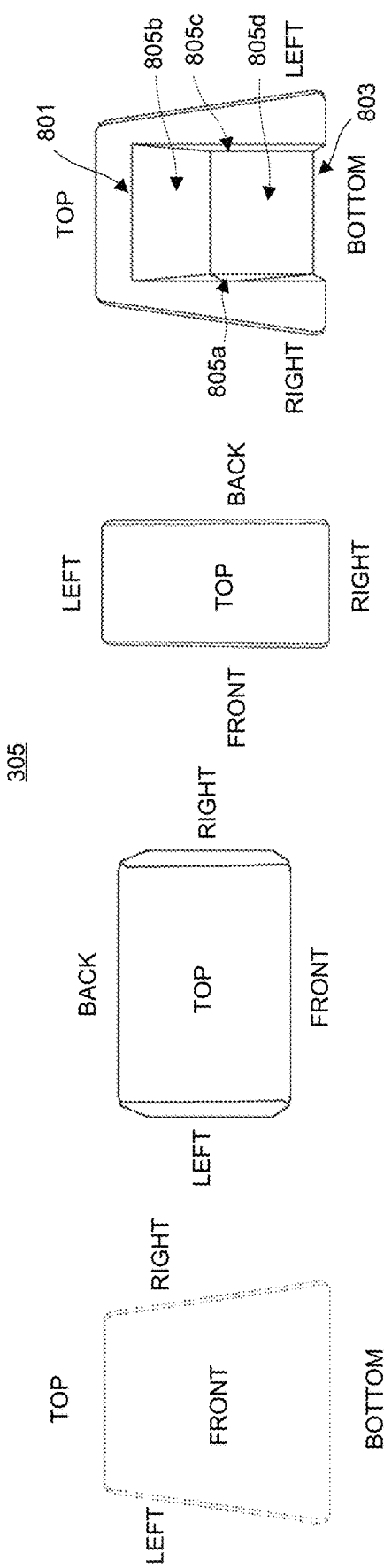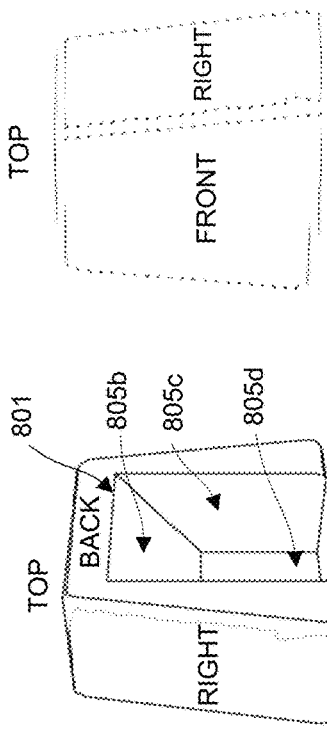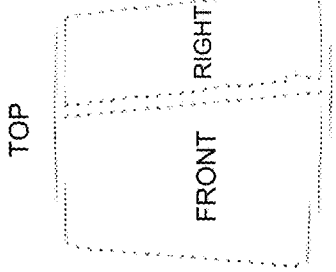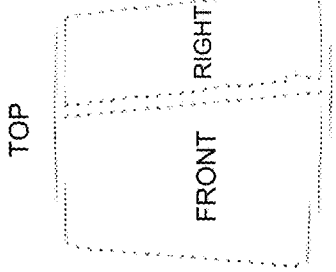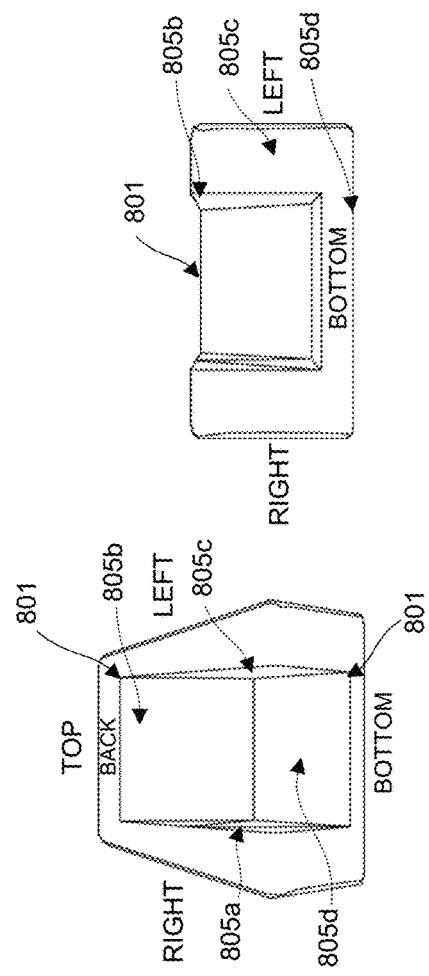

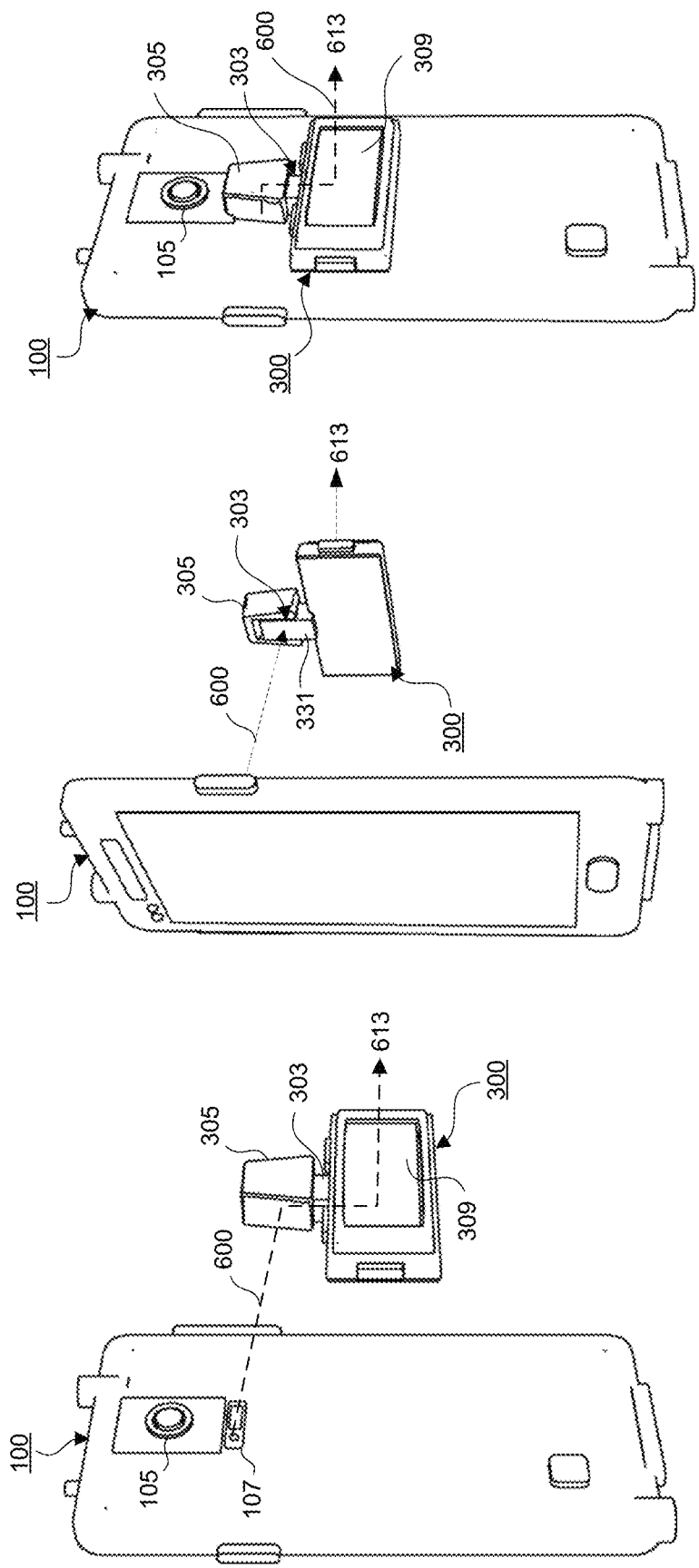

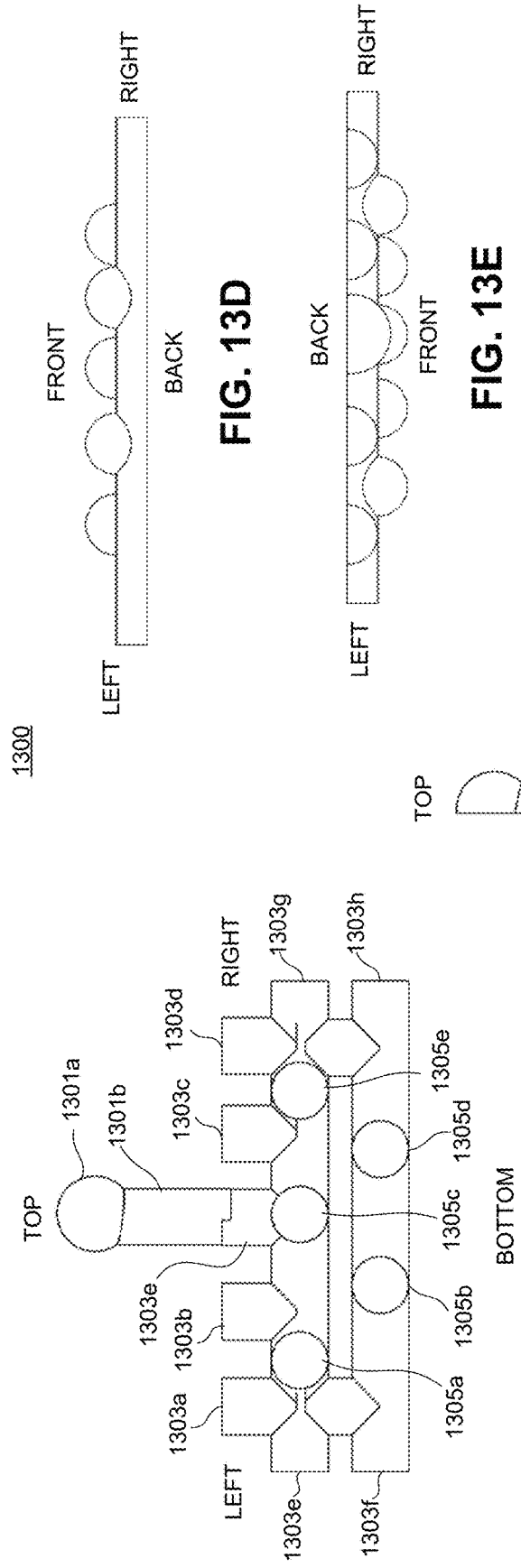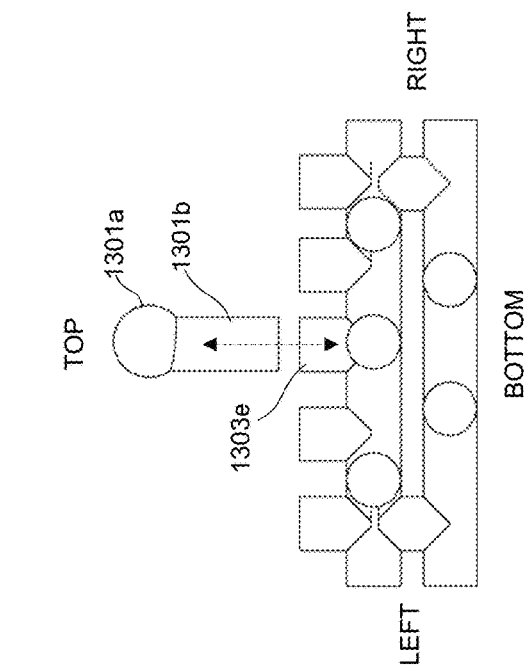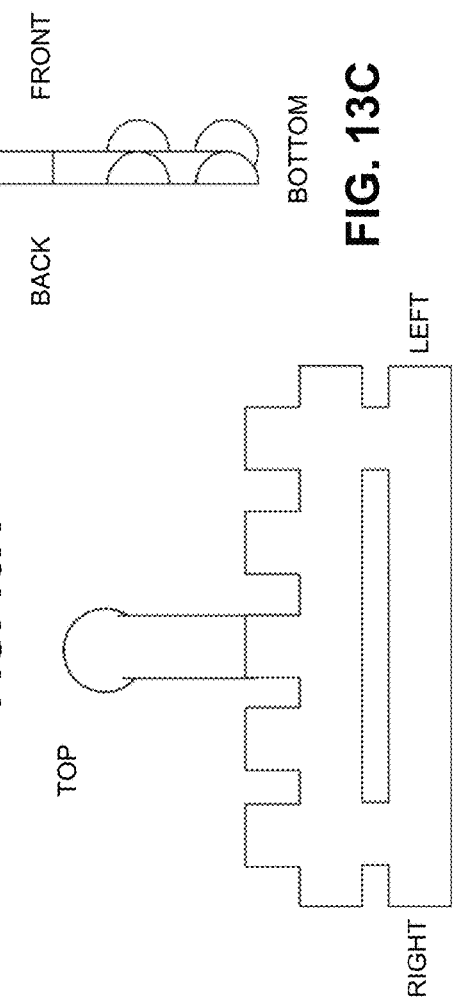

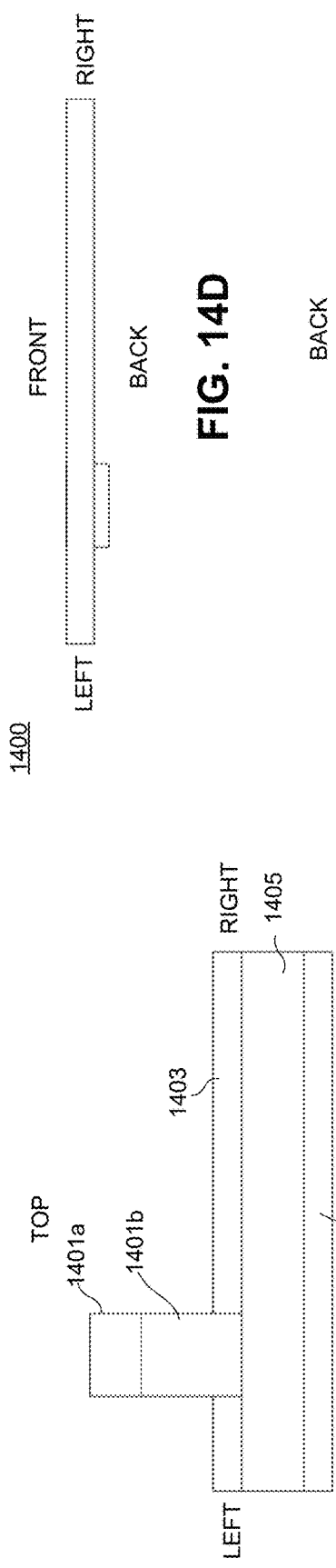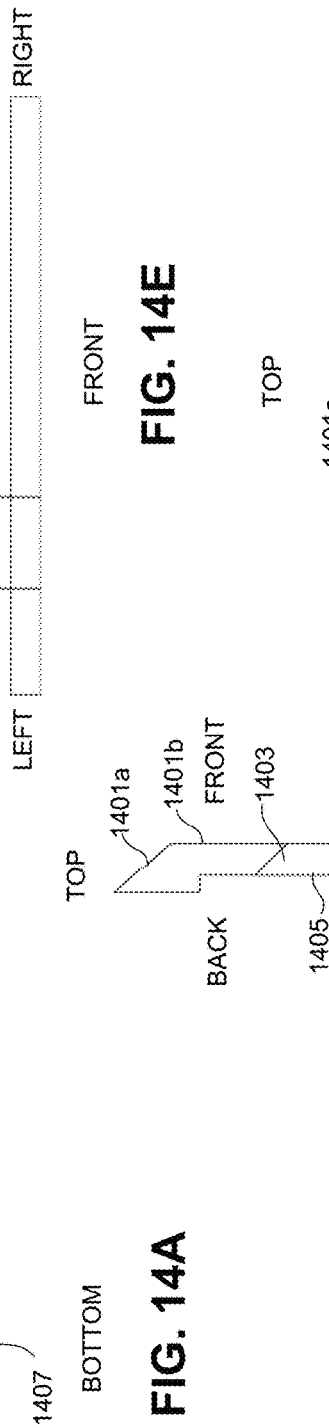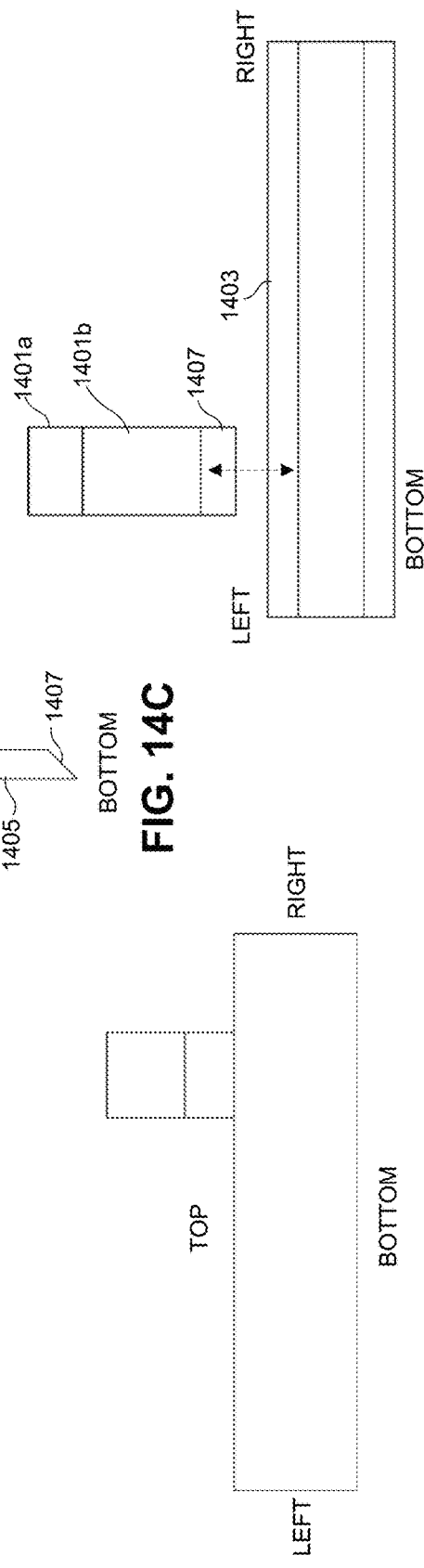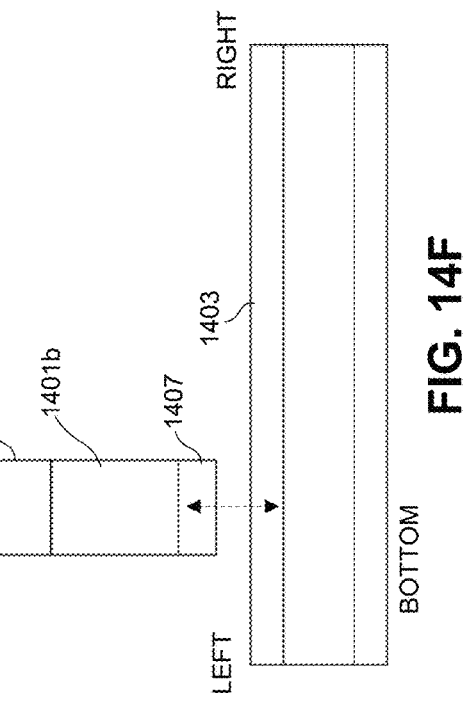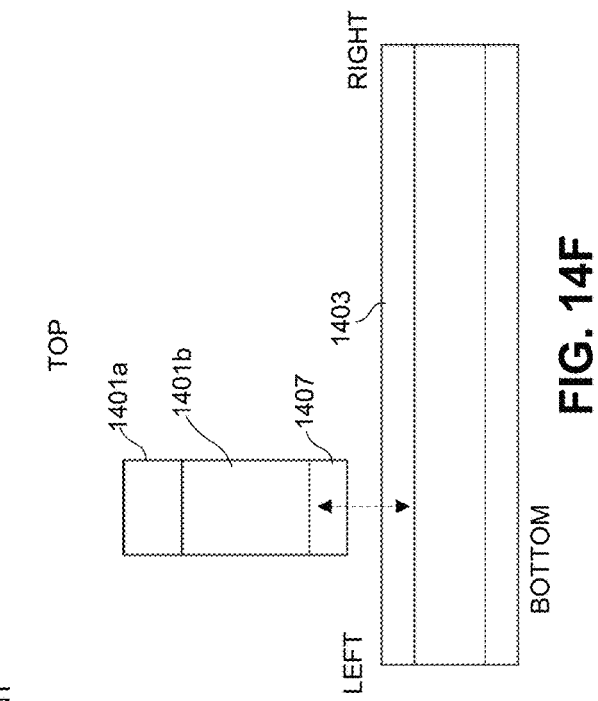
FIG. 14A
FIG. 14B
FIG. 14C
FIG. 14D
FIG. 14E
FIG. 14F

OPTICAL LIGHTING ACCESSORY FOR MOBILE PHONE DEVICES WITH CAMERA AND FLASH

RELATED APPLICATIONS

This application claims the benefit of priority of U.S. application Ser. No. filed Ser. No. 15/886,845, filed Feb. 2, 2018, which is herein incorporated by reference to the present application.

FIELD OF THE INVENTION

The present invention relates to an optical lighting accessory for smartphones or portable handheld mobile devices used in photography or videography. Particularly, the optical lighting accessory expands the lighting capabilities of the smartphone or portable handheld mobile device in selfie mode.

BACKGROUND

The popularity of social media has increased over the years and has made handheld portable phones a powerful communication and multimedia tool with powerful camera capabilities used in both photography and videography application. Current handheld portable devices such as smartphones and handheld mobile phones are equipped with sophisticated cameras (rear and front-facing) and a front facing touchscreen display screen for viewing live images to capture in either video mode or photography mode. A self-portrait photograph or "selfie" is accomplished by a user using the front-facing camera of the smartphone and directing the camera facing the user, while holding the smartphone in the hand at arm's length or supported by a selfie stick.

When capturing images, daylight conditions or areas that are adequately lit with artificial lighting provide the necessary lighting to capture subject at adequate exposure levels. However, in dark or poorly lit conditions, additional lighting is a necessity to provide the fill-in lighting or flash needed to capture the subject at the desired exposure levels. Most smartphones today are only equipped with a single flash making it difficult, if not impossible, to take selfies at night or in poorly lit areas. To address these sorts of lighting issues of taking selfies in poor lighting conditions, several lighting products have emerged in the marketplace including, for example, LED fill flash clips, ring-light flash, and cases with built-in LED lighting.

One such illumination apparatus for taking selfies on mobile devices is exemplified by U.S. Pat. No. 9,464,796, incorporated by reference herein in its entirety. This application generally teaches an illumination device generally that has a light source and an attachment assembly that connects the light source to the computing device. Another such lighting device apparatus for mobile devices is exemplified by U.S. Patent Application Publication No. US20170324438, incorporated by reference herein in its entirety. This application generally teaches a mobile device case, such as for a mobile phone, which has lighted panels that fold inwardly from an edge of the case. Yet another such lighting device apparatus for mobile devices is exemplified by U.S. Patent Application Publication No. US20160209025, incorporated by reference herein in its entirety. This application generally teaches a lighting device attachment for a mobile device having a housing that defines a cavity or an external coupling member configured to receive the mobile device, a light source within the housing, and an optical element adapted to project light from the light source to illuminate an external scene. The above patent documents generally discuss external lighting devices having external light sources and power sources that require electrical components to power and control the lighting devices such as an secondary LED flash.

One type of optical accessory for mobile devices is exemplified by U.S. Patent Application Publication No. US20170026499, incorporated by reference herein in its entirety. This application generally describes an attachment for use with a mobile device with an imaging device or with a case for the mobile device, and in particular to a system for scanning a barcode using a smartphone and other mobile devices. Another type of optical accessory for mobile devices is exemplified by U.S. Patent Application Publication No. US 20160296111, incorporated by reference herein in its entirety. This application generally teaches an optical accessory, which can be associated with a mobile device such as a smartphone or tablet, and in particular the optical accessory comprises coupling means to be functionally attached to the mobile device thereby substantially forming an ophthalmoscope.

Various illumination and flash fill devices for taking selfies using handheld mobile devices such as smartphones are known in the art as presented hereinabove, requiring electronic components and different in form and function from the present disclosure. Similarly, optical accessories for mobile devices do exist in various fields, but they are more complex in function and mechanically different than the present disclosure, and do not provide any novel solutions to the front-side illumination problems described by the present disclosure.

SUMMARY

It is an advantage of the present invention to provide an optical lighting accessory for use with a handheld mobile device having a front side, a backside, a rear-facing camera located on the backside of the handheld mobile device, and a light source located on the backside of the handheld mobile device, the optical lighting accessory including an accessory case having a plurality of optical light ports and an attachment member for securing the handheld mobile device to the accessory case; an optical element coupled to at least one of the plurality of optical light ports, the optical element configured to receive, capture and communicate a plurality of light rays emitted by the light source; and a light diffuser layer coupled to the optical element and configured to receive the plurality of light rays communicated by the optical element, the light diffuser layer transforms the plurality of light rays into a diffused light source, the light diffuser layer is configured to communicate the diffused light source to the rear-facing camera.

It is another advantage of the present invention to provide an optical lighting accessory for use with a handheld mobile device having a front side, a backside, a rear-facing camera located on the backside of the handheld mobile device, and a light source located on the backside of the handheld mobile device, the optical lighting accessory including a handheld mobile device protective case having a main body, the main body having a first side, a second side, a first window, and a second window, the first side is configured to receive the handheld mobile device, the first window defines a first opening for the rear-facing camera and the second window defines a second opening for the light source; an accessory case integrated into the second side of the main body, the accessory case includes a plurality of optical light ports; an optical element coupled to at least one of the plurality of optical light ports, the optical element configured to receive, capture and communicate a plurality of light rays emitted by the light source; and a light diffuser layer coupled to the optical element and configured to receive the plurality of light rays communicated by the optical element, the light diffuser layer transforms the plurality of light rays into a diffused light source, the light diffuser layer is configured to communicate the diffused light source to the rear-facing camera through the second window of the handheld mobile device protective case.

In another embodiment, the optical lighting accessory may include an optical intake hood coupled to the optical element, the optical intake hood is structured to protect the optical element and contain the plurality of light rays to an input region of the optical element.

In yet another embodiment, the optical intake hood may include a cavity defined by a plurality of walls formed in an interior of the optical intake hood, and a reflective surface is applied to the plurality of walls.

In another embodiment, the optical intake hood may be detachably coupled to the optical element. It still yet another embodiment, the optical lighting accessory includes a plurality of port covers detachably coupled to the plurality of optical light ports.

In one aspect, the optical lighting accessory may include a plurality of port covers detachably coupled to the plurality of optical light ports. In another aspect, the optical element is a transparent polyhedron light pipe, a transparent semi-spherical and transparent semi-cylindrical object, or a transparent tapered rectangular object.

In one application, optical element may include a light intake element having a transparent surface, an intake reflector coated with a reflecting surface, a plurality of light guide walls coated with the reflecting surface, and a light output element having a transparent surface.

In one embodiment, the optical element is detachably coupled to at least one of the plurality of optical light ports. In another embodiment, the optical lighting accessory of may include a vanity mirror coupled to an extended body formed on the accessory case, and the handheld mobile device may include a smartphone, a tablet, a laptop or a portable mobile computing device.

Other advantages of the novel optical lighting accessory apparatus include 1) provide diffused lighting to the backside high resolution camera without the use or need of additional external power sources or electronic components; 2) provide a vanity mirror on the backside of the handheld mobile device; 3) provide a source of illumination surrounding the vanity mirror; 4) convert the high intensity LED flash into a diffused light source, making it ideal for taking selfies with the backside camera and LED flash at night or in poorly lit areas by providing a uniform and mild intensity light source; 5) achieve case designs having a slim and slender profile, providing the user and ergonomic and comfortable fit when attached to the smartphone; 6) ability to easily support a variety of smartphones having different placement configurations of the backside camera and the LED flash as defined by different manufacturers.

These and other objects, features and advantages of the present invention will become more apparent in light of the following detailed description of preferred embodiments thereof, as illustrated in the accompanying drawings.

BRIEF DESCRIPTION OF THE DRAWINGS

The present invention will be more clearly understood from the following detailed description of the preferred embodiments of the invention and from the attached drawings, in which:

FIG. 8A-FIG. 8H illustrate multiple orthographic and perspective views of the optical intake hood, including a front view (FIG. 8A), a top view (FIG. 8B), a side view (FIG. 8C), a back view (FIG. 8D), a back perspective view (FIG. 8E), a bottom view (FIG. 8F), a side perspective view (FIG. 8G), and a front perspective view (FIG. 8H), in accordance with an embodiment.

FIG. 10A-FIG. 10C illustrate multiple perspective views of the smartphone device and the optical lighting accessory, including a rear perspective view (FIG. 10A), a front-side perspective view (FIG. 10B), and another rear perspective view with the optical lighting accessory attached to the smartphone device (FIG. 10C), in accordance to another embodiment.

FIG. 13A-FIG. 13F illustrate multiple views of another optical element, including a front view (FIG. 13A), a back view (FIG. 13B), a side view (FIG. 13C), a top view (FIG. 13D), a bottom view (FIG. 13E), and another configuration of the front view (FIG. 13F), in accordance to another embodiment.

FIG. 14A-FIG. 14F illustrate multiple views of yet another optical element, including a front view (FIG. 14A), a back view (FIG. 14B), a side view (FIG. 14C), a top view (FIG. 14D), a bottom view (FIG. 14E), and another configuration of the front view (FIG. 14F), in accordance to another embodiment.

In the appended figures, one or more elements may have the same reference numeral in different figures indicating previously described elements.

DETAILED DESCRIPTION

Embodiments in this disclosure include a novel optical lighting accessory apparatus and solution for a handheld mobile device to 1) provide diffused lighting to the backside high resolution camera without the use or need of additional external power sources or electronic components; 2) provide a vanity mirror on the backside of the handheld mobile device; and 3) provide a source of illumination surrounding the vanity mirror. Some of these handheld mobile devices include, for example, smartphones, tablets, computing notebooks, personal digital assistance (PDA) and the like that are equipped with a front-facing camera and flash.

Unlike the conventional fill-in flash devices which require a rechargeable power source and electrical components to provide the necessary front-side lighting to take selfie photographs, the novel optical lighting accessory apparatus only includes simple optical components, light-guides, mounting components, and uses the existing hardware and flash lighting already provided on the smartphone, making this less expensive and simple to manufacture, and advantageous and a key distinction over conventional fill-in flash devices or other optical accessories. Other advantages of the novel optical lighting accessory apparatus include 1) easy and flexible attachment to the smartphone, 2) light-weight, ultra-slim and ultra-compact to carry or store, 3) slim profile case making it ergonomically comfortable when attached to the smartphone 4) may be integrated into a case that also holds the smartphone, and 5) versatile and configured to fit many different smartphone bodies and cases.

Figure 1B:
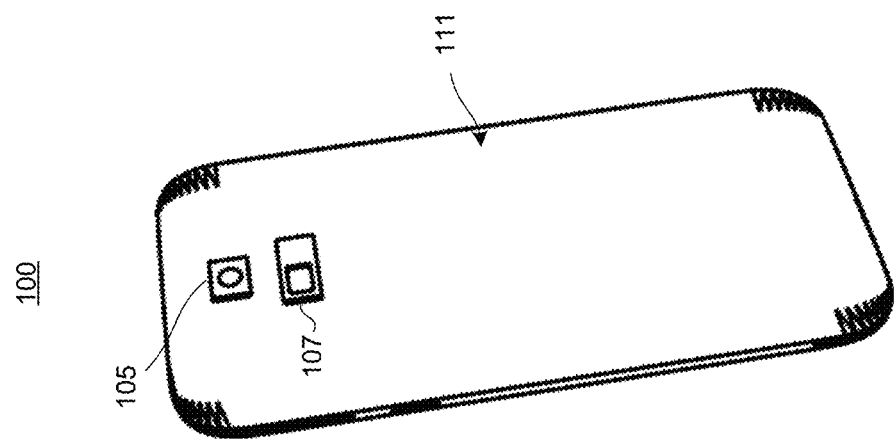
FIG. 1A and FIG. 1B illustrates a front and a rear perspective views, respectively, of a generic handheld mobile device having built-in camera.
Figure 1A:
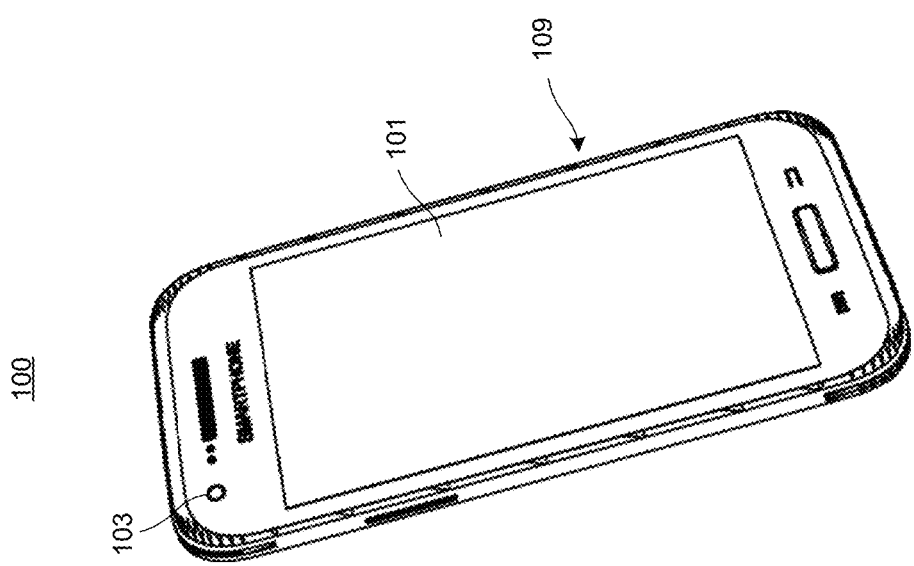

FIG. 1A and FIG. 1B illustrates front and rear perspective views, respectively, of a generic handheld mobile device (e.g., smartphone) 100. As shown in front side view in FIG. 1A, the handheld mobile device 100 includes a touchscreen display 101 for viewing text, graphics, and video, as well as providing input and making selections to various mobile applications ("apps") which are installed on the mobile device. The handheld mobile device 100 device may also include a front-side camera 103 located near the top of the mobile device for taking front-facing photographs or videos while a user is facing the touchscreen display 101. In FIG. 13, the backside of the handheld mobile device 100 is shown and includes a backside (or rear-facing) camera 105, having a higher in resolution than the front-facing camera 103), and a light source (LED flash) 107. The backside camera 105 may include high resolution CMOS image sensors, providing higher quality images than that of the front-side camera 103. As used throughout this document and for reference and identification purposes, the front facing side 109 of the handheld mobile device 100 is identified in FIG. 1A and includes the display and front-facing camera. Similarly, the rear facing side 111 of the smartphone 100 is identified in FIG. 13 and includes the LED flash 107 and backside camera 105.

Figure 2:
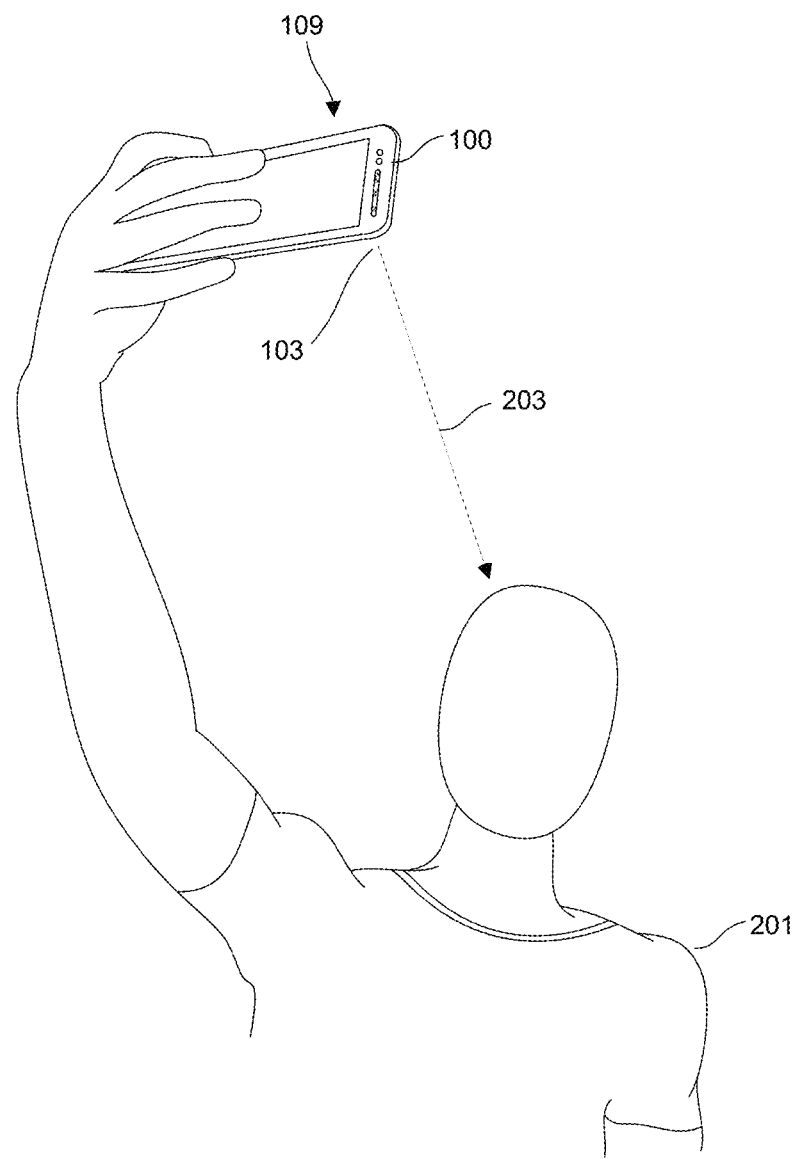
FIG. 2 illustrates an example of a self-portrait photograph or "selfie" by user using the backside camera of the handheld mobile device.

FIG. 2 illustrates an example of a user 201 taking a self-portrait ("selfie") photograph or video while holding the handheld mobile device 100 in their hand at arm's length with the backside camera 105 facing and directed along path 203 so that camera 105 is facing the user 201. In poorly lit environments or at night, taking selfie photographs or videos using the backside camera 105 with the flash enabled can be accomplished by the user 201. However, due to the high intensity and brightness of the LED flash 107, taking selfies at night using backside camera 105 may be difficult, causing discomfort or irritation to the user's eyes while attempting to directly view the backside camera 105 with the LED flash 107 enabled. As presented in this document, the novel optical accessory apparatus overcomes this problem in several ways using novel optical and diffused lighting components that allow users to take selfie photos using the backside camera in poorly lit or nighttime environments. For example, the novel optical accessory apparatus is structured to convert the high intensity LED flash 107 into a diffused light source, making it ideal for taking selfies with the backside camera 105 and LED flash 107 at night or in poorly lit areas by providing a uniform and mild intensity light source.

Figure 3:
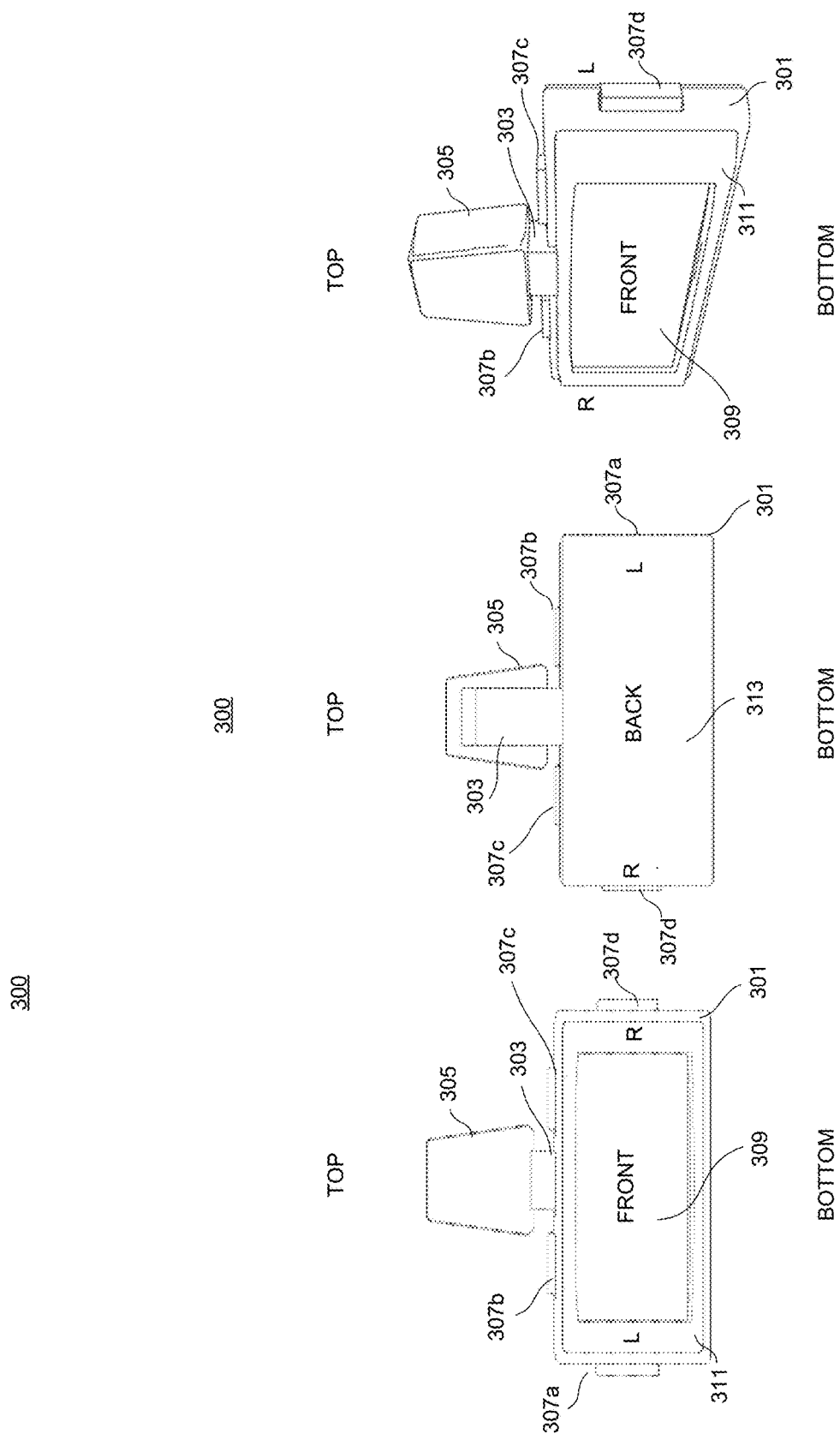
FIG. 3A, FIG. 3B, and FIG. 3C illustrate a front side view, a backside view, and side perspective view, respectively, of a novel optical lighting accessory for providing diffused lighting to the backside camera of the handheld mobile device, in accordance with an embodiment.

FIG. 3A, FIG. 3B, and FIG. 3C illustrate a front side view, a backside view, and side perspective view, respectively, of a novel optical lighting accessory 300 for providing diffused lighting (or fill-in lighting) to the backside camera 105 of the handheld mobile device 100, in accordance with an embodiment. The optical lighting accessory 300 includes, for example, an optical lighting accessory case 301; an optical element 303 coupled to the top of the accessory case 301; an optical intake hood 305 coupled to the optical element 303; multiple detachable port covers (307a-307d) inserted into corresponding optical light pipe ports formed in the accessory case 301; a light diffuser panel 309 coupled to the face of the accessory case 301; a light panel support member 311 for securing the light diffuser panel 309 to the face of the accessory case 301; and a backside plate 313 coupled to the backside of the accessory case 301. Optical members of the optical lighting accessory 300 may be configured to redirect the light rays from a primary light source (e.g., LED flash 107) and convert the light rays into a diffused and uniform state. To redirect the light rays, the optical element 303 may have certain structural properties that redirect light rays through total internal reflection. Examples of some optical elements 303 may include light pipes, light tubes, optical waveguides and other similar optical components for transporting and guiding light. Materials generally used to fabricate the optical element 303 may include, for example, clear polycarbonate, clear acrylic, glass, or other durable transparent materials. These and other optical members, structure and various embodiments of the optical lighting accessory 300 are provided later herein below.

Figure 4:
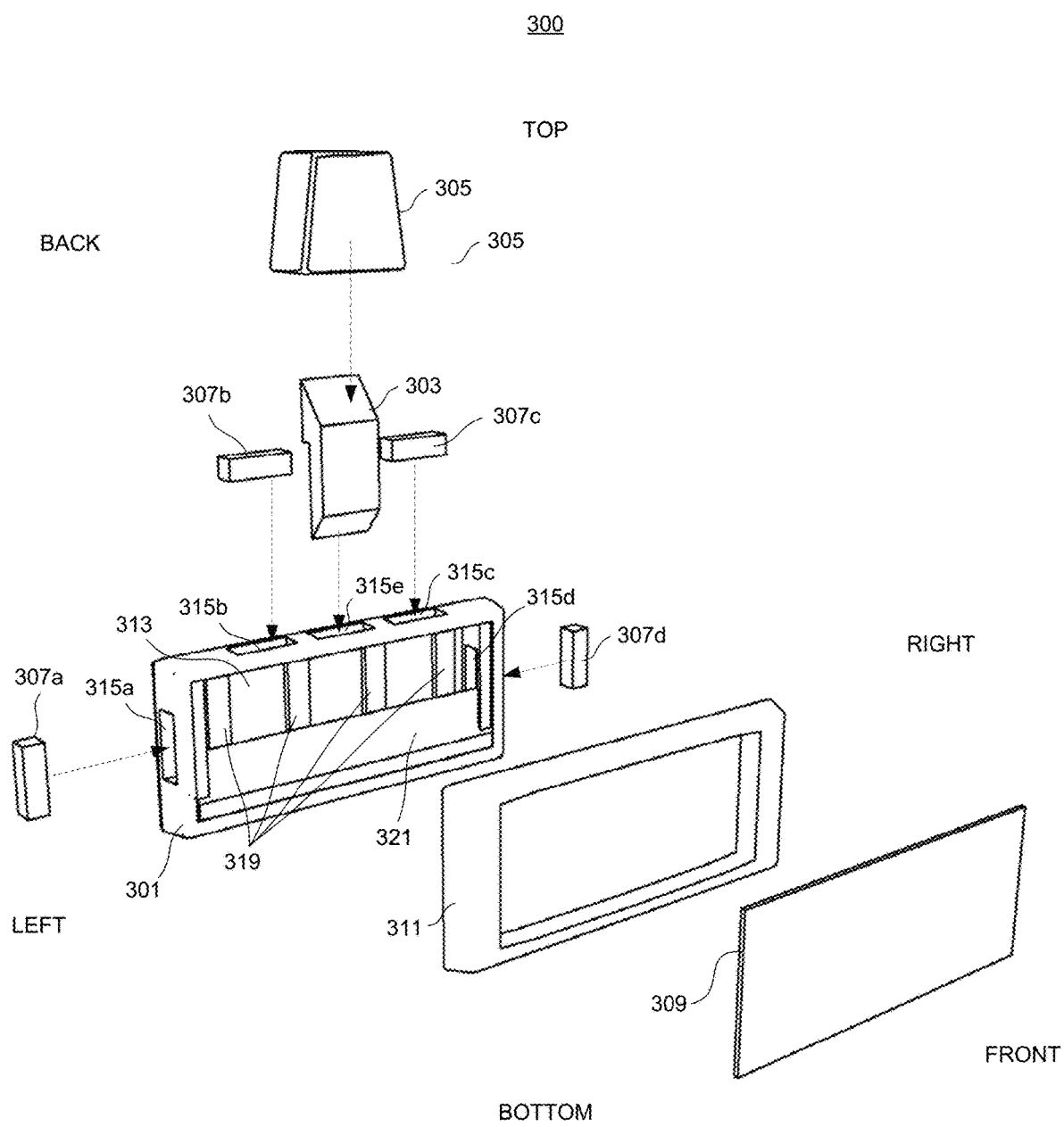
FIG. 4 illustrates an exploded view of the optical lighting accessory, in accordance with an embodiment.
Figure 5:
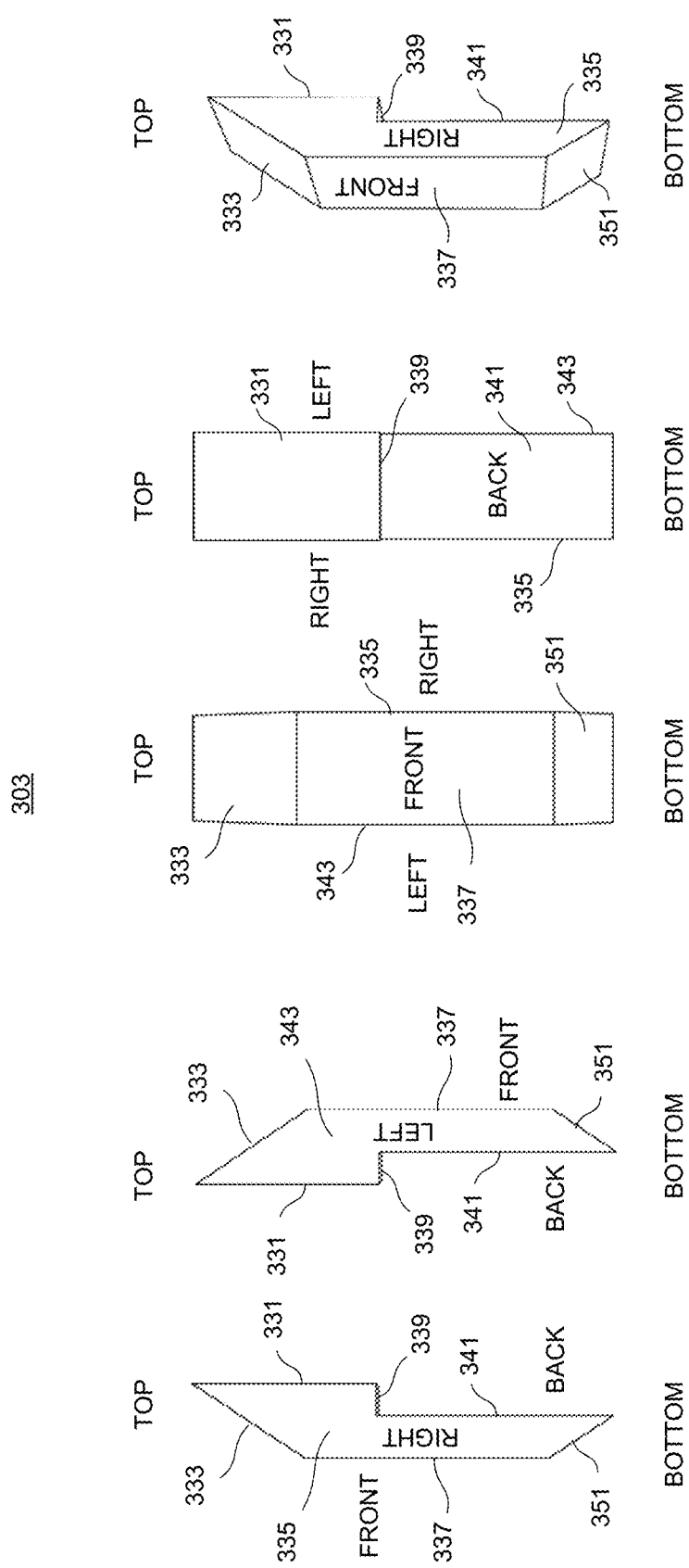
FIG. 5A FIG. 5B, FIG. 5C, and FIG. 5D illustrate a right side, front, back, and perspective views, respectively, of the optical element, in accordance with an embodiment.

FIG. 4 illustrates an exploded view of the optical lighting accessory 300, in accordance with an embodiment. The accessory case 301 may be structured to include supporting members and coupling elements that secure the optical element and detachable port covers (307a-307d) to the case 301. For example, the case 301 may include multiple optical light ports optical light ports (315a-315e) formed along the sidewalls of the case 301. In this example, each optical light port (315a-315e) are rectangular cavities formed along the sidewalls of the case 301 that are structured to receive and couple to the optical element 303. The advantage of the optical light ports (315a-315e) and different configurations of optical element 303 may allow the optical lighting accessory 300 to support and adapt to a variety of smartphone mobile devices from different manufacturers without the need to change the case 301. In addition, each detachable port cover (307a-307d) may provide access to a corresponding optical light port (315a-315e) when removed and may prevent light from escaping through the optical light ports (315a-315e) when attached to the case 301. The case 301 may also include support guides 319 that guide and retain the optical element 303 to a particular optical light port (315a-315e). The case 301 may also include an optional sloped reflector panel 321 extending along the bottom portion of the case 301. In operation, the sloped reflector panel 321 may be used to redirect lighting from the optical element 303 to the light diffuser panel 309. In addition, a reflective coating material may be applied to the entire interior of the case 301 including the interior of the backside plate 313, interior side walls and support guides 319 in order to further redirect lighting from the optical element 303 to the light diffuser panel 309.

FIG. 5A FIG. 5B, FIG. 5C, and FIG. 5D illustrate a right side, front, back, and perspective views, respectively, of the optical element 303. These illustrations present the general size, shape and location of the optical element 303 which is in the form of a transparent polyhedron light pipe with 8 faces, in accordance with an embodiment. Each face (331, 333, 335, 337, 339, 341, 343, 351) of the optical element 303 is configured to redirect and guide light from an input side to an output side. In this example, the optical element 303 may include a light intake element 331 having a transparent surface, an intake reflector 333 coated with a reflecting surface, a plurality of light containment and guide walls (335, 337, 339, 341, 343) each coated with reflecting surfaces, and a light output element 351 having a transparent surface.

Figure 6:
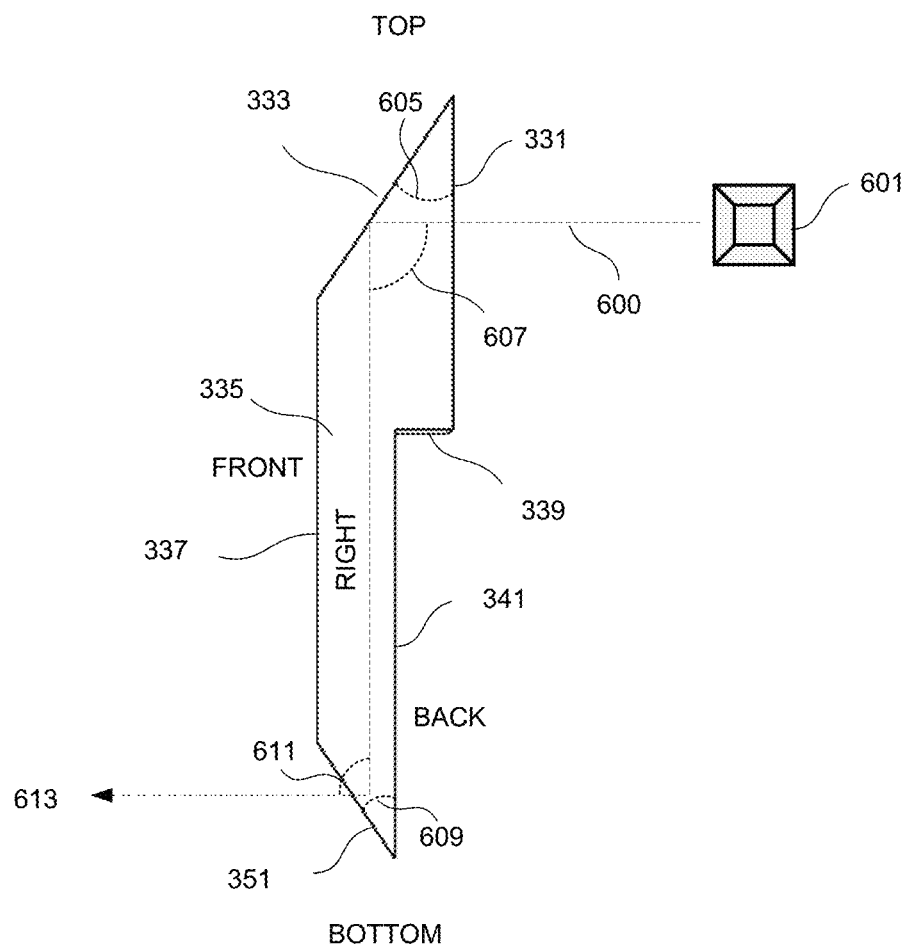
FIG. 6 illustrates a side view of an incoming light from a light source emitted to the optical element, in accordance with an embodiment.

FIG. 6 illustrates a side view of an incoming light 600 from a light source 601 emitted to the optical element 303. Functionally, the optical element 303 at the light intake element 331 may be coupled to the light source 601 and receive the incoming light 600 emitted by the light source 601. The incoming light 600, upon striking the intake reflector 333, is redirected and guided by the light containment and guide walls (335, 337, 339, 341, 343) within the interior of the transparent polyhedron light pipe to the light output element 351. The intake reflector 333 of the transparent polyhedron light pipe may be structured to form a first acute angle 605 which is configured to redirect the incoming light 600 at about 90 degrees 607. Similarly, the light output element 351 of the transparent polyhedron light pipe may be structured to form a secondary acute angle 609 which is configured to redirect the incoming light 600 to a light output region 613 at about 90 degrees 611.

Figure 7B:
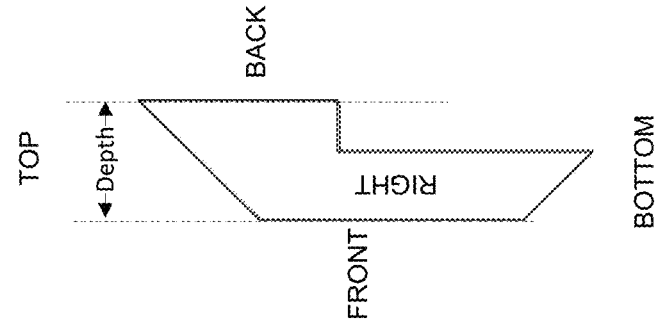
FIG. 7A and FIG. 7B illustrate a front view and a right side view, respectively, of the optical element and show typical working dimensions of the transparent polyhedron light pipe, in accordance with an embodiment.
Figure 7A:
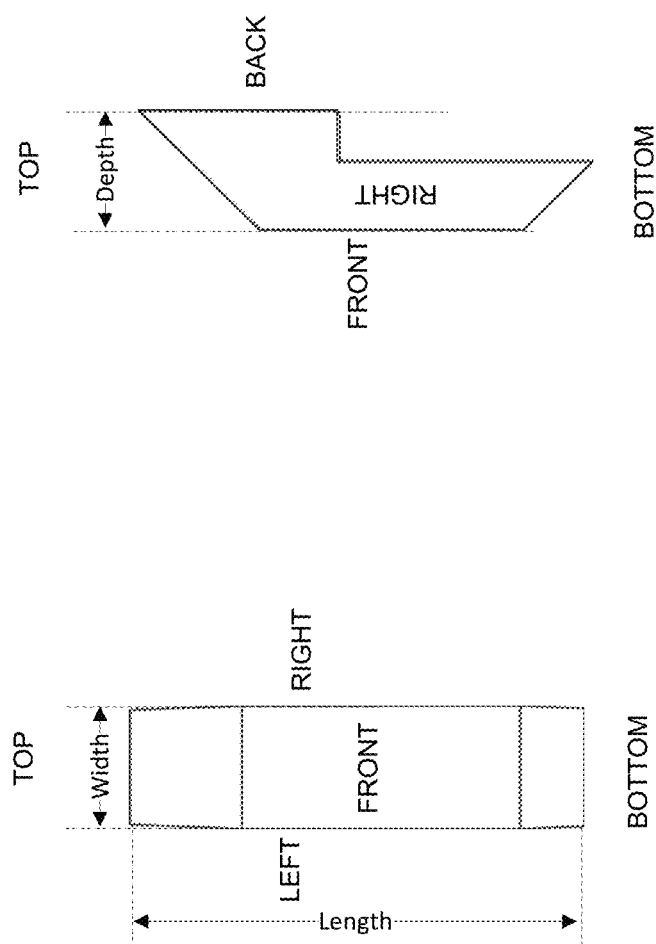

FIG. 7A and FIG. 7B illustrate a front view and a right side view, respectively, of the optical element 303 and show typical working dimensions of the transparent polyhedron light pipe. In FIG. 7A, for example, typical working dimensions of the transparent polyhedron light pipe having a length of about 9 mm to 12 mm, and a width of about 12 mm to 25 mm, respectively. FIG. 7B illustrates typical working dimensions of the transparent polyhedron light pipe having a depth range of about 1 mm to 10 mm. These dimensions allow the case 301 of the optical lighting accessory 300 to achieve case design with a slim and slender profile, providing the user and ergonomic and comfortable fit when attached to the smartphone 100.

FIG. 8A-FIG. 8H illustrate multiple orthographic and perspective views of the optical intake hood 305, including a front view (FIG. 8A), a top view (FIG. 8B), a side view (FIG. 8C), a back view (FIG. 8D), a back perspective view (FIG. 8E), a bottom view (FIG. 8F), a side perspective view (FIG. 8G), and a front perspective view (FIG. 8H). The optical intake hood 305 has many valuable purposes including 1) protecting the optical element 303 from being scratched, broken or damaged 2) containing the light from the light source to the optical element 303 and prevent it from escaping from the light intake element 331, and 3) preventing the light source from leaking to the camera 105 and exposing the sensor with extra light, causing exposure uniformity problems. In one embodiment, the general shape of optical intake hood 305 may be in the form of a tapered rectangular box having sides of different shapes. For example, the optical intake hood 305 may include front and back sides that have a tapered rectangle shape, while the top, bottom, and sides of the optical intake hood 305 are generally rectangular in shape as shown in FIG. 8A, FIG. 8B, FIG. 8C, and FIG. 8D.

Referring to FIG. 8D, FIG. 8E, FIG. 8F, and FIG. 8G, a cavity 801 is formed in the interior of the optical intake hood 305 having an optical element opening 803 and multiple interior walls (805a, 805b, 805c, 805d) defined in the interior thereof. The multiple interior walls (805a, 805b, 805c, 805d) which forms the cavity 801 is generally shaped to be conformal to the top portion of the optical element 303 and configured to receive the optical element 303 when the optical intake hood 305 is attached. An optional reflective surface may be applied to the multiple interior walls (805a, 805b, 805c, 805d) to provide additional containment and redirection of the light from the light source.

In some implementations, materials used to fabricate the optical intake hood 305 may include, for example, moldable plastics, rubber, metals, or glass. In practice, the optical intake hood 305 may be permanently attached to the optical element 303 or made to be detachable from the optical element 303.

Figure 9:
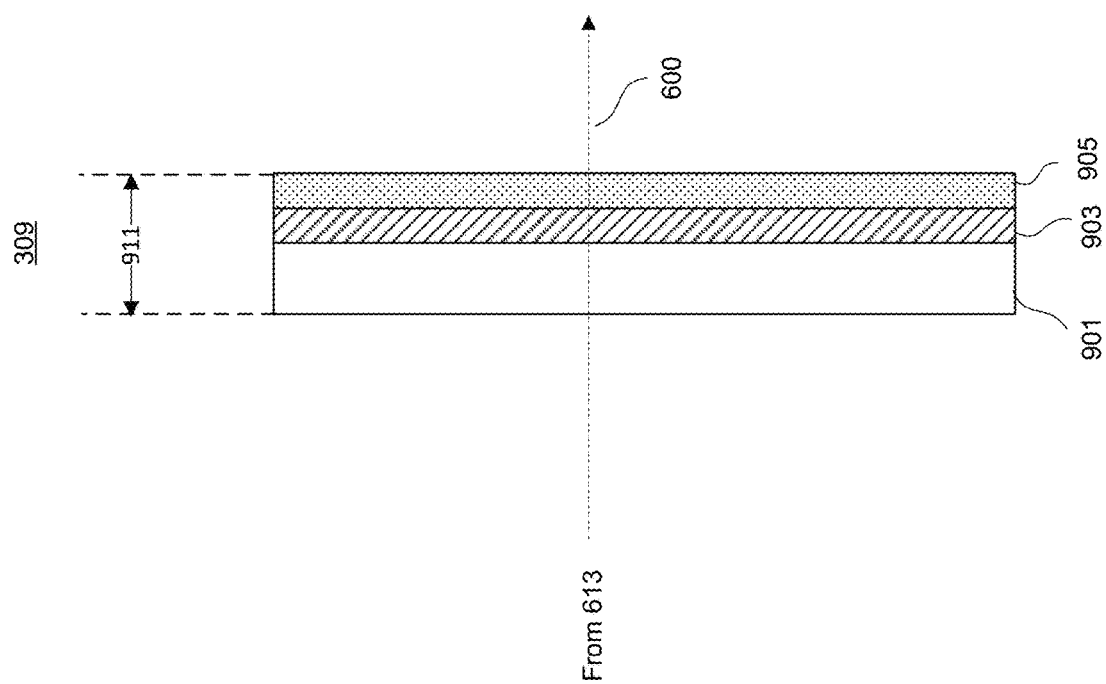
FIG. 9 illustrates a cross-sectional view of the light diffuser panel, in accordance to another embodiment.

FIG. 9 illustrates a cross-sectional view of the light diffuser panel 309, in accordance to another embodiment. The light diffuser panel 309 may include multiple stacked layers including a transparent substrate layer 901, a diffuser layer 903, and an optional color filter layer 905. In practice, the substrate layer 901 may include transparent rigid materials such as clear polycarbonate, clear acrylics, clear polymer sheets, or glass. The diffuser layer 903 may include transparent or translucent grated surfaces, and other coating materials that scatter or partially blocks light. The color filter layer 905 may include color coated films made of transparent pieces of dyed glass, plastic, inorganic or organic translucent material that have been treated to selectively transmit a certain color. The combined stacked layers 911 of the light diffuser panel 309 may vary in thickness and may range anywhere between 0.25 mm to 0.75 mm. In application, the incoming light 600 emitted by the light source 601 at the light output region 613 generally strikes the transparent substrate layer 901 and exits through the diffuser layer 903 and the optional color filter layer 905.

FIG. 10A, FIG. 10B, and FIG. 10C illustrate multiple perspective views of the smartphone device 100 and the optical lighting accessory 300, including a rear perspective view (FIG. 10A), a front-side perspective view (FIG. 10B), and another rear perspective view with the optical lighting accessory 300 attached to the smartphone device 100 (FIG. 10C), in accordance with another embodiment. As shown in FIG. 10A, the backside camera 105 and the LED flash 107 of the smartphone device 100 are both visible in this view. Also shown in FIG. 10A is the optical lighting accessory 300 which is slightly pulled forward and with its backside facing the backside camera 105 and the LED flash 107. Upon enabling the LED flash 107 of the smartphone device 100, the light 600 emitted from the LED flash 107 is transmitted to the light intake element 331 of the optical element 303 of the optical lighting accessory 300 which in turn redirects the light along the light path (dashed lines) to the light diffuser panel 309, producing diffused lighting at the output region 613 as demonstrated in FIG. 10A, FIG. 10B, and FIG. 10C. In practice, the optical lighting accessory 300 is attached directly to the backside of the smartphone device 100 so that the optical element 303 and the optical intake hood 305 completely cover the LED flash 107 as shown in FIG. 10C. Attachment means to secure and fasten the optical lighting accessory 300 to the smartphone 100 may include, but is not limited to, adhesive tapes, loop and hooks fasteners, clips, straps, and clamps.

Figure 11A:
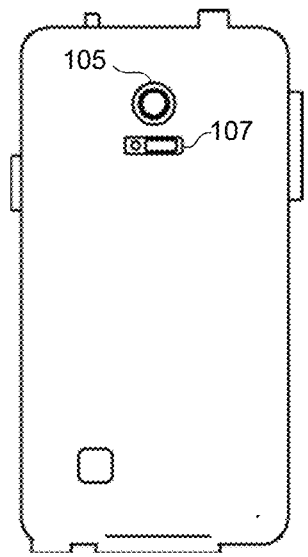
FIG. 11A-FIG. 11F illustrate multiple backside views of the smartphone device having different backside camera and the LED flash placement configurations.
Figure 11B:
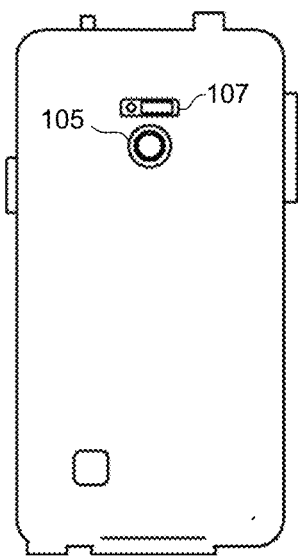
Figure 11C:
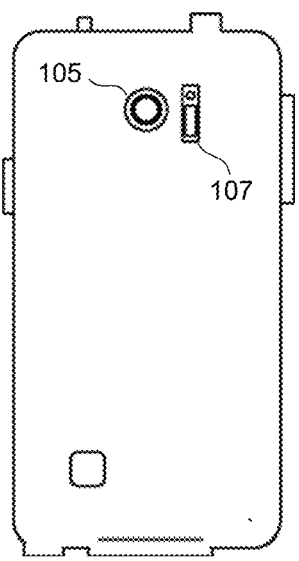
Figure 11D:
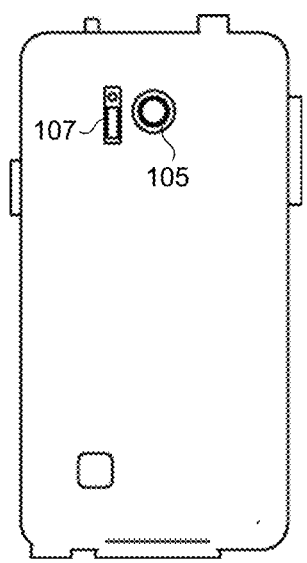
Figure 11E:
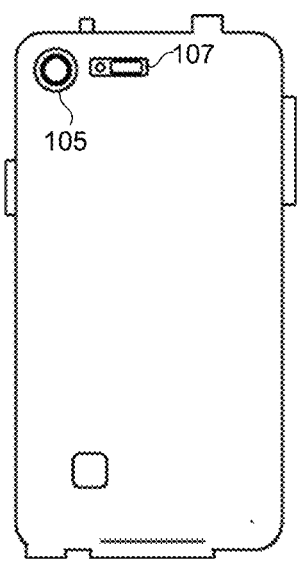
Figure 11F:
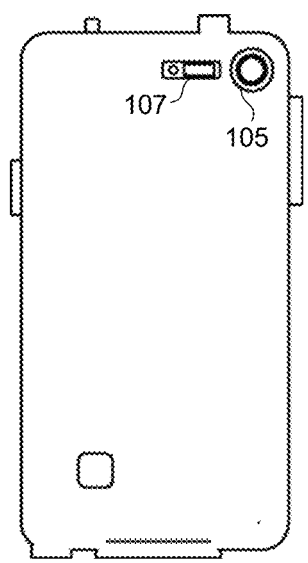

FIG. 11A-FIG. 11F illustrate backside views of the smartphone device 100 having different backside camera 105 and the LED flash 107 placement configurations. Smartphone devices from different manufacturers are typically not the same having different designs, sensors, and configurations. For example, in one smartphone device configuration, the backside camera 105 and LED flash 107 may be situated at the top center of the smartphone 100 with the backside camera 105 positioned above the LED flash 107 as shown in FIG. 11A. In another smartphone configuration, the backside camera 105 and LED flash 107 may be situated at the top center of the smartphone 100 with the backside camera 105 positioned below the LED flash 107 as shown in FIG. 1B. In yet another configuration, the backside camera 105 and LED flash 107 may be situated at the top center of the smartphone 100 with the backside camera 105 positioned to the left of the LED flash 107 as shown in FIG. 11C. In still yet another configuration, the backside camera 105 and LED flash 107 may be situated at the top center of the smartphone 100 with the backside camera 105 positioned to the right of the LED flash 107 as shown in FIG. 11D. In another configuration, the backside camera 105 and LED flash 107 may be situated at the top left corner of the smartphone 100 with the backside camera 105 positioned to the left of the LED flash 107 as shown in FIG. 11E. In yet another configuration, the backside camera 105 and LED flash 107 may be situated at the top right corner of the smartphone 100 with the backside camera 105 positioned to the right of the LED flash 107 as shown in FIG. 11F.

Figure 12C:
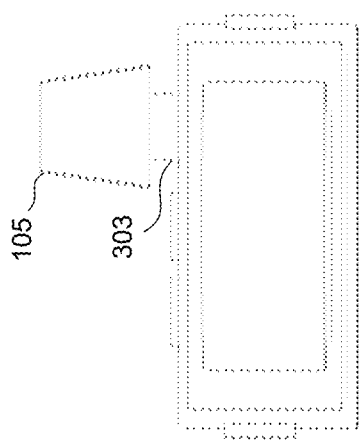
FIG. 12A-FIG. 12E illustrate multiple front views of the optical lighting accessory having different optical element placement configurations.
Figure 12B:
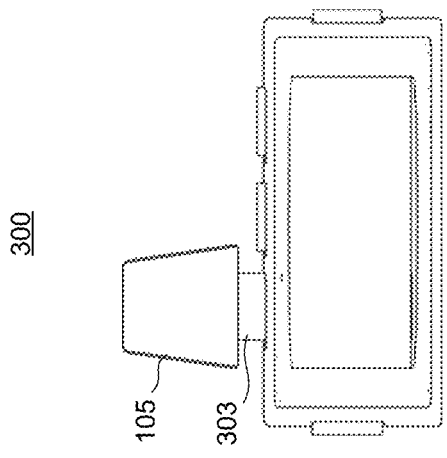
Figure 12A:
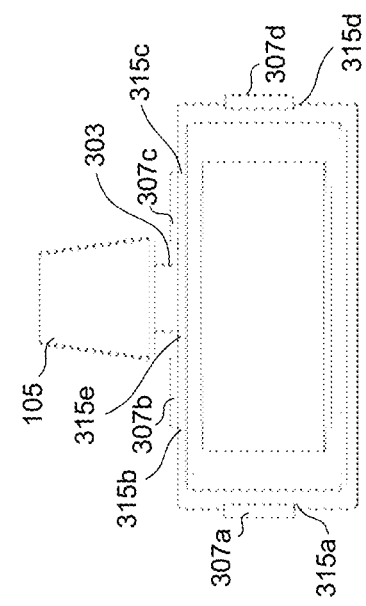
Figure 12E:
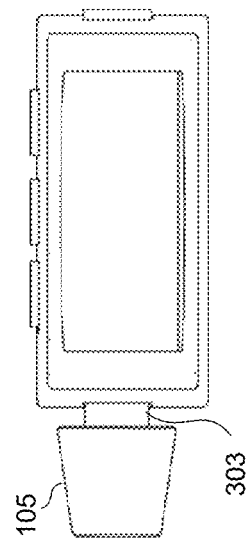
Figure 12D:
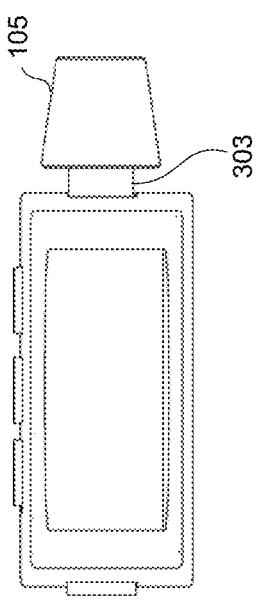

FIG. 12A-FIG. 12E illustrate front views of the optical lighting accessory 300 having different optical element 303 placement configurations. To support and accommodate the wide variety of smartphones by different manufacturers having smartphones that are designed with different placement configurations of the backside camera 105 and the LED flash 107, the optical lighting accessory 300 may be configured to match the position of each different placement configuration by providing a detachable optical element 303 that may be removed from its port and reinserted into another port that best suits and matches a particular smartphone configuration. For example, FIG. 12A illustrates a reference position of the detachable optical element 303 which is centrally positioned to the body of the case 300. In practice, the detachable optical element 303 positioned at the center port 315e shown in FIG. 12A would best match the smartphone 100 shown in FIG. 11A. Similarly, the detachable optical element 303 positioned at the left most port 315b shown in FIG. 12B would best match the smartphone 100 shown in FIG. 11E. In another example, the detachable optical element 303 positioned at the right most port 315c shown in FIG. 12C would best match the smartphone 100 shown in FIG. 11F. These and other combinations and arrangement of the detachable optical element 303 inserted into other optical light port (315a, 315d) are provided in FIGS. 12D and 12E, respectively. As it is apparent by these examples, one key advantage of the optical lighting accessory 300 is its ability to easily support a variety of smartphones having different placement configurations of the backside camera 105 and the LED flash 107 as defined by different manufacturers.

FIG. 13A, FIG. 13B, FIG. 13C, FIG. 13D, FIG. 13E, and FIG. 13F illustrate multiple views of another optical element 1300, including a front view (FIG. 13A), a back view (FIG. 13B), a side view (FIG. 13C), a top view (FIG. 13D), a bottom view (FIG. 13E), and another configuration of the front view (FIG. 13F), in accordance to another embodiment. The optical element 1300 in this embodiment is materially and functionally the same as the previous embodiment described hereinabove, redirecting and guiding incoming light 600 from an input light source to the light output region 613. In particular, the optical element 1300 may include a light input stem having a stem input element 1301a in the shape of a semi sphere and a stem light guide element 1301b in the shape of a semi cylinder coupled to the stem input element 1301a. The optical element 1300 may also include multiple light input elements (1303a-1303h) for receiving light 600 from the stem input element 1301a. In addition, the optical element 1300 may include multiple light output elements (1305a-1305e) for emitting the receiving light 600 to the diffuser layer 309, the multiple light output elements (1305a-1305e) coupled to the multiple light input elements (1303a-1303h). The light input stem (1301a, 1301b) is configured to be detachable from the multiple light output elements (1305e) and reinserted to be coupled with other available multiple light output elements (1305a-1305e) as shown in FIG. 13F.

FIG. 14A, FIG. 14B, FIG. 14C, FIG. 14D, FIG. 14E, and FIG. 14F illustrate multiple views of yet another optical element 1400, including a front view (FIG. 14A), a back view (FIG. 14B), a side view (FIG. 14C), a top view (FIG. 14D), a bottom view (FIG. 14E), and another configuration of the front view (FIG. 14F), in accordance to another embodiment. The optical element 1400 in this embodiment is materially and functionally the same as the previous embodiment described hereinabove, redirecting and guiding incoming light 600 from an input light source to the light output region 613. In particular, the optical element 1400 may include a light input stem having a stem input element 1401a in the general shape of a prism and a stem light guide element 1401b in the shape of a rectangular box coupled to the stem input element 1401a. The optical element 1400 may also include light rail 1405 in the shape of a tapered rectangular box for receiving light 600 from the stem input element 1401a. The light rail 1405 may include input light rail input element 1403 for receiving light 600 from the stem input element 1401a and a light rail output element 1407 coupled to the input light rail input element 1403 for emitting the receiving light 600 to the diffuser layer 309. The light input stem (1401a, 1401b) is configured to be detachable from the light rail 1405 and reinserted to be coupled to a different horizontal positions along the input light rail input element 1403 as shown in FIG. 14F.

Figure 15:
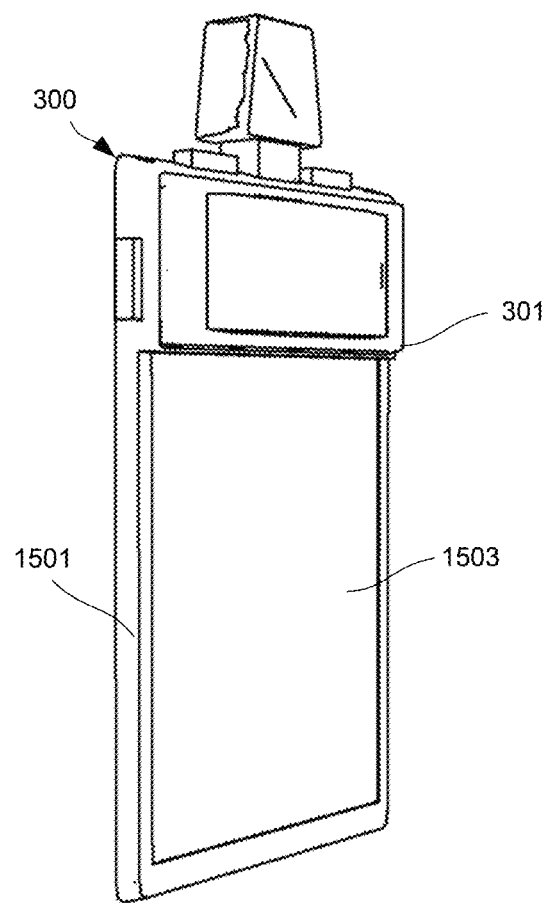
FIG. 15 illustrates a front perspective view of the optical lighting accessory having an extended body to support and house a vanity mirror, in accordance to another embodiment.

FIG. 15 illustrates a front perspective view of the optical lighting accessory 300 having an extended body 1501 to support and house a vanity mirror 1503, in accordance to another embodiment. The vanity mirror 1503 may be coupled to an extended portion of the accessory case 301 near the bottom of the optical lighting accessory 300 for providing additional structural support to the optical lighting accessory 300 as well for self-grooming purposes.

Figure 16:
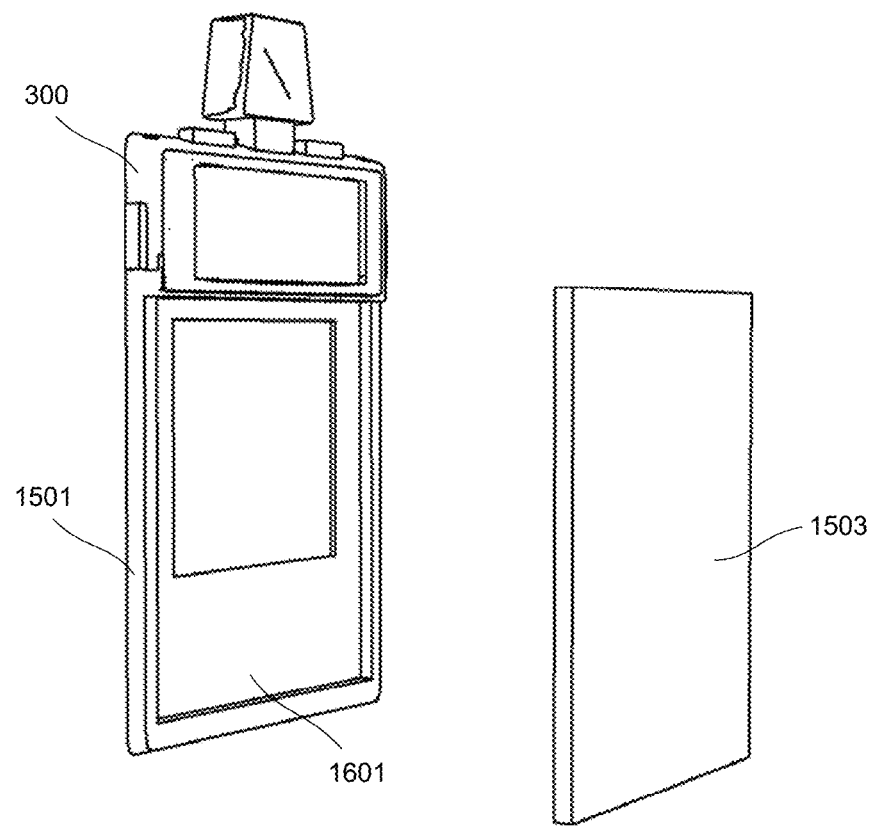
FIG. 16 illustrates an exploded view of the optical lighting accessory with the extended body to support and house the vanity mirror, in accordance to another embodiment.

FIG. 16 illustrates an exploded view of the optical lighting accessory 300 with the extended body 1501 to support and house the vanity mirror 1503, in accordance to another embodiment. The case 300 may also include a mirror support wall 1601 formed in the extended body 1501 to support and fasten the vanity mirror 1503 to the case 300. Attachment mechanisms for securing and fastening the vanity mirror 1503 to the mirror support wall 1601 may include, but is not limited to, adhesive tapes, liquid adhesives, mounting clips, and loop and hooks fasteners.

Figure 17:
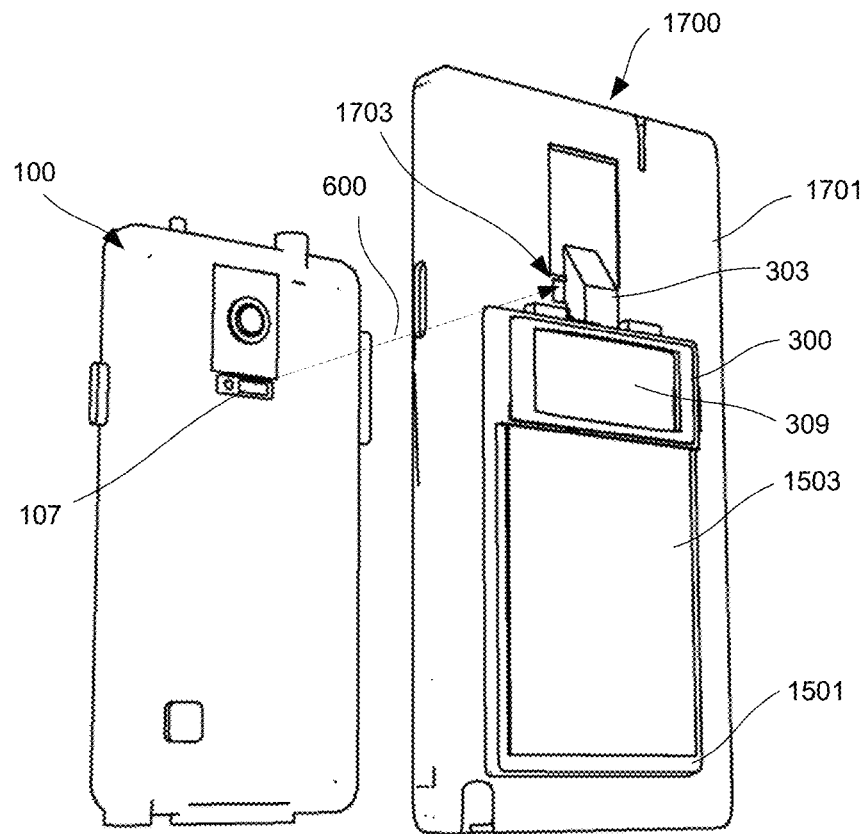
FIG. 17 illustrates a front perspective view of a protective mobile phone case with an integrated optical lighting accessory and vanity mirror, in accordance to another embodiment.

FIG. 17 illustrates a front perspective view of a protective mobile phone case 1701 with an integrated optical lighting accessory 300 and vanity mirror 1503, in accordance to another embodiment. In practice, each protective mobile device case 1701 may include a recessed interior portion to match and receive the contour, shape and body of the smartphone device 100 from different smartphone manufacturers. These protective mobile device cases may embed the optical lighting accessory 300 and vanity mirror 1503 to the backside of the protective mobile device case 1701 to form a combined protective and optical lighting accessory case 1700. In operation, when the smartphone 100 is attached to the combined protective and optical lighting accessory case 1700, light 600 from the LED flash 107 of the smartphone 100 is projected through a cutout opening 1703 formed in the protective mobile device case 1701 and directed to the optical element 303 of the optical lighting accessory 300 and then subsequently redirected to the diffuser layer 309 to form and output a diffused light source.

Figure 18:
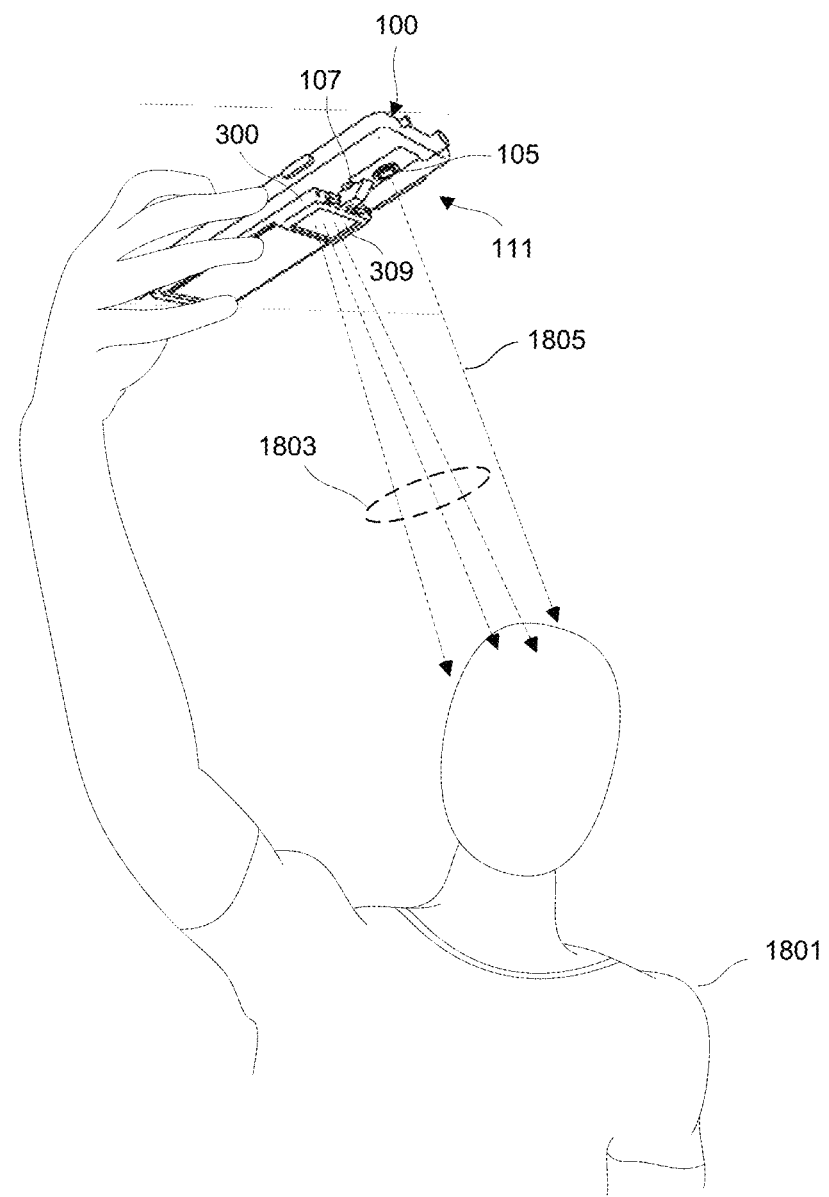
FIG. 18 illustrates a basic implementation of the optical lighting accessory attached to the rear facing side of the smartphone device while a user is taking a photograph or video in "selfie" mode.

FIG. 18 illustrates a basic implementation of the optical lighting accessory 300 attached to the rear facing side 111 of the smartphone device 100 while a user 1801 is taking a photograph or video in "selfie" mode. In this example, a diffused light (fill-in lighting) 1803 formed by the diffuser layer 309 of the optical lighting accessory 300 is projected toward the user 1801 by the optical lighting accessory 300 when the LED flash 107 is enabled on the smartphone device 100, providing adequate diffused lighting and exposure to the backside camera 105 pointing in the direction along path 1805 that is facing the user 1801.

The optical lighting accessory may be constructed to meet different requirements affecting functional performance metrics, visual appeal, cost, and durability. For example, to provide adequate fill-in lighting in photography and video applications, depending on the application and use by the user 1801, different sizes of diffuser layers 309 and optical elements 303 of the optical lighting accessory 300 may be implemented can improve or enhance the coverage, range, and performance of the diffused light (fill-in lighting) 1803 provided by the optical lighting accessory 300.

Figure 19:
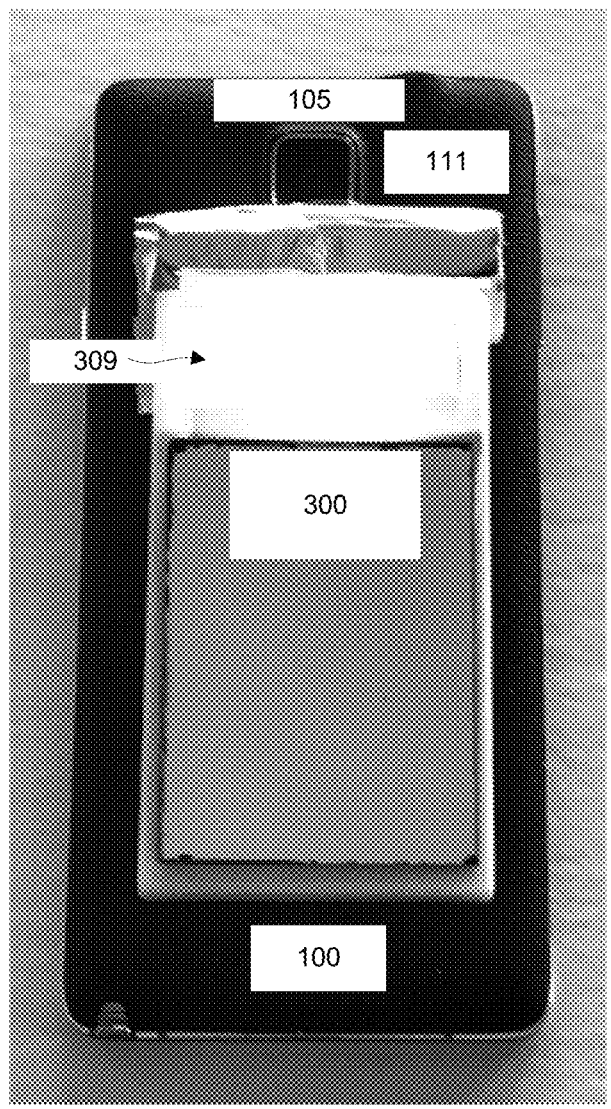
FIG. 19 illustrates an image of a working model of the optical lighting accessory attached to the rear facing side 111 of the handheld mobile device with the LED flash enabled.

FIG. 19 illustrates an image of a working model of the optical lighting accessory 300 attached to the rear facing side 111 of the handheld mobile device 100 with the LED flash 107 (not visible) enabled. As shown in FIG. 19, light from the LED flash 107 is redirected by the optical lighting accessory 300 via the optical element 303 (not visible) to the diffuser layer 309 providing the user a diffused and uniform light intensity for the purpose of taking selfies using the backside camera 105.

As used in the specification and the appended claims, the singular forms "a", "an", and "the" included plural referents unless the context clearly dictates otherwise.

All patents, patent applications, and other references cited herein are incorporated by reference in their entireties.

It is noted that the foregoing disclosure has been provided merely for the purpose of explanation and is in no way to be construed as limiting of the present invention. Although the present invention has been shown and described with respect to several preferred embodiments thereof, various changes, omissions, and additions to the form and detail thereof, may be made therein, without departing from the spirit and scope of the invention. It is understood that the words which have been used herein are words of description and illustration, rather than words of limitation. Changes may be made, within the purview of the appended claims, as presently stated and as amended, without departing from the scope and spirit of the present invention in its aspects.

Other embodiments and modifications of the present invention may occur to those of ordinary skill in the art in view of these teachings. Accordingly, the invention is to be limited only by the following claims which include all other such embodiments and modifications when viewed in conjunction with the above specifications and accompanying drawings.

What is claimed is:

1. An optical lighting accessory for use with a handheld mobile device having a front side, a backside, a rear-facing camera located on the backside of the handheld mobile device, and a light source located on the backside of the handheld mobile device, the optical lighting accessory comprising:
    an accessory case having a plurality of optical light ports and an attachment member for securing the handheld mobile device to the accessory case;
    an optical element coupled to at least one of the plurality of optical light ports, the optical element configured to receive, capture and communicate a plurality of light rays emitted by the light source; and
    a light diffuser layer coupled to the optical element and configured to receive the plurality of light rays communicated by the optical element, wherein the light diffuser layer transforms the plurality of light rays into a diffused light source, wherein the light diffuser layer is configured to communicate the diffused light source to the rear-facing camera.

2. The optical lighting accessory of claim 1 further comprising an optical intake hood coupled to the optical element, wherein the optical intake hood is structured to protect the optical element and contain the plurality of light rays to an input region of the optical element.

3. The optical lighting accessory of claim 2, wherein the optical intake hood includes a cavity defined by a plurality of walls formed in an interior of the optical intake hood, wherein a reflective surface is applied to the plurality of walls.

4. The optical lighting accessory of claim 3, wherein the optical intake hood is detachably coupled to the optical element.

5. The optical lighting accessory of claim 1 further comprising a plurality of port covers detachably coupled to the plurality of optical light ports.

6. The optical lighting accessory of claim 1, wherein the optical element is a transparent polyhedron light pipe.

7. The optical lighting accessory of claim 6, wherein the optical element includes a light intake element having a transparent surface, an intake reflector coated with a reflecting surface, a plurality of light guide walls coated with the reflecting surface, and a light output element having a transparent surface.

8. The optical lighting accessory of claim 1, wherein the optical element is detachably coupled to at least one of the plurality of optical light ports.

9. The optical lighting accessory of claim 1 further comprising a vanity mirror coupled to an extended body formed on the accessory case.

10. The optical lighting accessory of claim 1, wherein the handheld mobile device is a smartphone, a tablet, a laptop or a portable mobile computing device.

11. An optical lighting accessory for use with a handheld mobile device having a front side, a backside, a rear-facing camera located on the backside of the handheld mobile device, and a light source located on the backside of the handheld mobile device, the optical lighting accessory comprising:
- a handheld mobile device protective case having a main body, the main body having a first side, a second side, a first window, and a second window, wherein the first side is configured to receive the handheld mobile device, the first window defines a first opening for the rear-facing camera and the second window defines a second opening for the light source;
- an accessory case integrated into the second side of the main body, wherein the accessory case includes a plurality of optical light ports;
- an optical element coupled to at least one of the plurality of optical light ports, the optical element configured to receive, capture and communicate a plurality of light rays emitted by the light source; and
- a light diffuser layer coupled to the optical element and configured to receive the plurality of light rays communicated by the optical element, wherein the light diffuser layer transforms the plurality of light rays into a diffused light source, wherein the light diffuser layer is configured to communicate the diffused light source to the rear-facing camera through the second window of the handheld mobile device protective case.

12. The optical lighting accessory of claim 11 further comprising an optical intake hood coupled to the optical element, wherein the optical intake hood is structured to protect the optical element and contain the plurality of light rays to an input region of the optical element.

13. The optical lighting accessory of claim 12, wherein the optical intake hood includes a cavity defined by a plurality of walls formed in an interior of the optical intake hood, wherein a reflective surface is applied to the plurality of walls.

14. The optical lighting accessory of claim 13, wherein the optical intake hood is detachably coupled to the optical element.

15. The optical lighting accessory of claim 11 further comprising a plurality of port covers detachably coupled to the plurality of optical light ports.

16. The optical lighting accessory of claim 11, wherein the optical element is a transparent polyhedron light pipe.

17. The optical lighting accessory of claim 16, wherein the optical element includes a light intake element having a transparent surface, an intake reflector coated with a reflecting surface, a plurality of light guide walls coated with the reflecting surface, and a light output element having a transparent surface.

18. The optical lighting accessory of claim 11, wherein the optical element is detachably coupled to at least one of the plurality of optical light ports.

19. The optical lighting accessory of claim 11 further comprising a vanity mirror coupled to an extended body formed on the accessory case.

20. The optical lighting accessory of claim 11, wherein the handheld mobile device is a smartphone, a tablet, a laptop or a portable mobile computing device.

* * * * *